Feb. 7, 1967    R. J. FRITZ    3,303,329
MARK SENSING SYSTEM
Filed Dec. 3, 1962    3 Sheets-Sheet 1

INVENTOR
RUDOLPH J. FRITZ
BY Paul D. Carmichael
ATTORNEY

United States Patent Office 3,303,329
Patented Feb. 7, 1967

3,303,329
MARK SENSING SYSTEM
Rudolph J. Fritz, Binghamton, N.Y., assignor to International Business Machines Corporation, New York, N.Y., a corporation of New York
Filed Dec. 3, 1962, Ser. No. 241,820
14 Claims. (Cl. 235—61.11)

The present invention relates generally to the sensing and electronic arts and more particularly to an improved system for sensing marks made at predesignated locations or areas on a document.

The general philosophy of mark sensing is well-known and widely employed at the present time. A user is supplied with a document having a plurality of areas indicated thereon in which marks, such as pencil or ink lines, can be placed. The marks represent information elements or quantities, and a plurality of the areas are usually provided for each information quantity to be represented. For example, in test scoring applications, a number of possible marking areas are associated with each question, and the student is instructed to place a mark in the area corresponding to the correct answer for each question. The amount of money paid by a customer can also be recorded in a similar manner if ten possible marking areas representing the integers 0–9 are provided for each digit of the amount. For certain applications where both numeric and alphabetic information quantities are to be recorded, a total of twelve vertically aligned possible marking areas can be arranged in a column on a document for each information quantity. Columns of the marking areas are disposed in adjacent side-by-side relation so that the document has a format corresponding to the well-known punched card, and the Hollerith coding scheme is employed for representing the information quantities. In addition to the indicated marking areas or locations, the document has a plurality of preprinted timing marks thereon. A timing mark is associated with each column on the document and is used for synchronizing and control purposes, as will be hereinafter more fully explained.

When a document has been marked in accordance with the desired information quantities, the same is fed into a machine and passed by a sensing station so that output indications corresponding to the information quantities, such as a punched card, a printed record, input signals for other data processing apparatus or the like, are provided. A typical sensing station will comprise means to illuminate the document, a plurality of reading channels, and a timing channel whereby the possible marking areas are scanned or read on a column-by-column basis as the document is moved past the sensing station. An optical-to-electrical transducer and amplifier circuitry are associated with each of the reading channels and the timing channel.

While sensing stations of the above-described type are widely employed, they are subject to certain inherent limitations. The characteristics and output signals of the transducers associated with the reading channels and timing channel will quite often vary due to aging, changes in environmental conditions, the collection of dust and dirt during normal operation or the like. This may result in an erroneous output from one or more channels indicating either the presence of a mark in a marking area where no mark has been placed or that a mark is not present in an area where one has been recorded. The timing marks are usually located adjacent an edge of the document and a small tear or an extraneous marking may be recognized by the timing channel as a preprinted timing mark. In order to conserve document space, the columns of possible marking areas are located in closely spaced adjacent relation, and a relatively small space is provided for each possible mark. An individual may place a mark so that, although a portion of the mark falls within the prescribed area, the leading and/or trailing edge thereof falls outside of the designated area. Further, the transducers of the data and timing channels must be accurately aligned or positioned with respect to each other and the path of document travel.

Briefly, the present invention provides an improved mark sensing system for converting the marks made in selected ones of predesignated marking areas or locations on a document to corresponding electrical signals. The timing channel, which controls the operation of the reading channels, comprises a means for automatically adjusting for variations in the normal operating level of the timing transducer. The amplifier in the timing channel is responsive to the width of the marks sensed by the timing transducer so that document tears and extraneous markings can be distinguished from the preprinted timing marks. The amplifiers in the reading channels are provided with automatic threshold adjusting means to compensate for variations in the normal operating levels of the reading transducers. Each of the amplifiers in the reading channels will produce an output signal indicating the sensing of a mark if the leading edge or trailing edge of a mark is detected in a preselected gating interval. Further, an output signal will also be produced when the leading edge of a mark is detected prior to the gating interval and the trailing edge is not detected during this gating interval.

It is the primary or ultimate object of the invention to provide a system for sensing marks made at predesignated locations on a document and to provide output indications corresponding thereto wherein means are employed for automatically compensating for changes in the normal operating characteristics and output signals of the transducers. The overall operation of the mark sensing system remains the same regardless of changes in the signal levels supplied by any one or all of the transducers due to aging, temperature or humidity changes, the accumulation of dust and dirt, changes in the normal reflectance values of different documents or the like.

Another object of the invention is the provision of a mark sensing system capable of recognizing valid marks but insensitive to document tears and invalid marks. The signal from the timing transducer is differentiated so that a signal from a wide mark containing low frequency components will produce a signal having a greater absolute magnitude than a signal from a thin mark which contains high frequency components and relatively few low frequency components. By proper design of the preprinted timing marks on the document, the sensing system will not respond to invalid marks.

A further object of the invention is to provide on a mark sensing system which will properly respond to a mark covering a portion of a predesignated marking area but whose leading and/or trailing edge falls outside of this area. An output signal representing a mark is produced by the associated reading channel when the leading or trailing edge of the mark is within the marking area. An output signal is also produced if the leading edge occurs outside the marking area and trailing edge is not detected within a predetermined time interval. The document is designed so that a large number of information quantities are represented in a minimum document area.

A still further object of the invention is the provision of a mark sensing system of the type above described which is characterized by its extreme simplicity in construction and operation and is highly reliable.

The foregoing and other objects, features and advantages of the invention will be apparent from the following more detailed description of a preferred embodiment of the invention as illustrated in the accompanying drawings.

Figure 1:
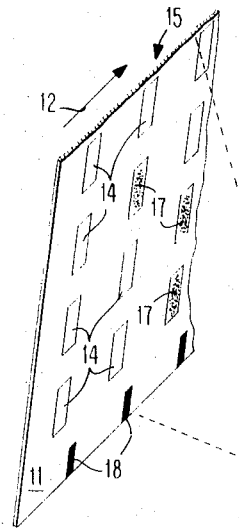
FIGURE 1 is a perspective view showing a sensing station of a mark sensing system constructed in accordance with and employing the teachings of this invention.
Figure 1:
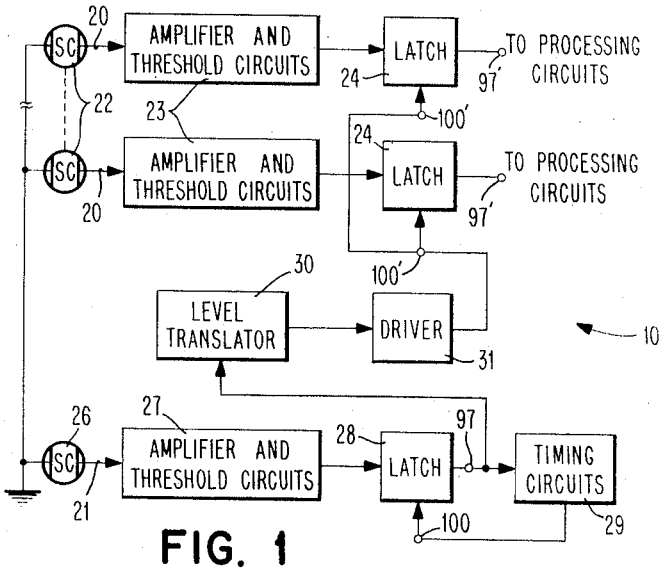

Referring now to the drawings, and initially to FIGURE 1 thereof, the reference numeral 10 designates generally a station for sensing marks placed in predesignated marking areas or locations on a document 11 and providing output indications corresponding to the sensed marks. The document 11 is moved past the sensing station 10 in the direction indicated by arrow 12 and has a plurality of predesignated marking locations or areas 14 thereon. The marking areas 14 are arranged in adjacent vertical columns 15, and each of the columns corresponds to an information quantity. The user places a mark or marks 17 with a pencil or other marking instrument in the area or areas 14 of each column 15 corresponding to the information quantities to be entered. Disposed along the lower edge of the document 11 are a plurality of preprinted timing marks 18. One of the timing marks 18 is provided for each column 15 and is positioned slightly forward of the column in the direction of document travel.

The marked document 11 is moved past the sensing station where the same is illuminated by a suitable light source 19. Located at the sensing station are a plurality of reading channels 20 and a timing channel 21. The reading channels each comprises an optical-to-electrical transducer 22, such as a solar cell, amplifying and automatic threshold control circuits 23 and a bistable temporary storage device or latch 24 for producing an output signal corresponding to the presence or absence of marks in the predesignated marking areas. One of the reading channels is provided for each horizontal row of the predesignated marking areas 14 on the document. As will be hereinafter more fully explained, the amplifier and automatic threshold control circuits 23 of the reading channels 20 are operative to actuate the latches 24 in a manner to designate the presence of marks even though the leading and/or trailing edges of the marks do not occur within the confines of the predesignated marking areas.

The timing channel 21 is generally similar to the reading channels 20 and comprises a solar cell 26, amplifier and automatic threshold control circuits 27 and a latch 28. Each of the latches 24 and 28 has a conditioning and reset input which must be at a proper voltage level before the latch is responsive to the outputs of the associated amplifier and automatic threshold control circuits. The conditioning and reset input of latch 28 receives signals from timing circuits 29 while the output of this latch is applied via a level translator 30 and driver logic block 31 to the conditioning and reset inputs of the latches 24 of the reading channels. The amplifier and threshold circuits 27 of the timing channel have means to distinguish between a valid preprinted timing mark and invalid marks, such as a tear in the document, as will be later explained.

The over-all operation of the mark sensing system is that as a column 15 on the document enters the sensing area, the timing circuits 29 provide a signal which conditions latch 28 of the timing channel. The passage of the timing mark 18 is sensed by solar cell 26, and the latch 28 assumes its other bistable state. The output signal from latch 28 is applied to the conditioning and reset inputs of the latches 24 through level translator 30 and driver logic block 31. The solar cells 22 sense the marks recorded in the predesignated marking areas 14 for the column on the document, and this information is stored in the latches 24.

The output signal from latch 28 is also supplied to timing circuits 29 which, after a preselected delay interval, provides a signal to the conditioning and reset input of latch 28 to reset the same to its initial stable state. Immediately after latch 28 is reset, the latches 24 associated with the reading channels are also reset. The time interval extending from when latch 28 is set in response to the sensing of a timing mark until the latch is reset by the timing circuits 29 defines the interval in which the latches 24 may be set in accordance with the marks made in the column.

The timing circuits 29, level translator 30, and driver logic block 31 will not be described in detail in the following portions of the specification as these circuits, in and of themselves, do not form a portion of the present invention. The timing circuits 29 provide certain controlling or gating signals to the conditioning and reset input of latch 28 in response to other occurrences at the mark sensing station. The translator 30 and driver logic block 31 perform level setting and powering functions. Further, the construction and operation of such circuits is well-known to those skilled in the computer arts.

Figure 6:
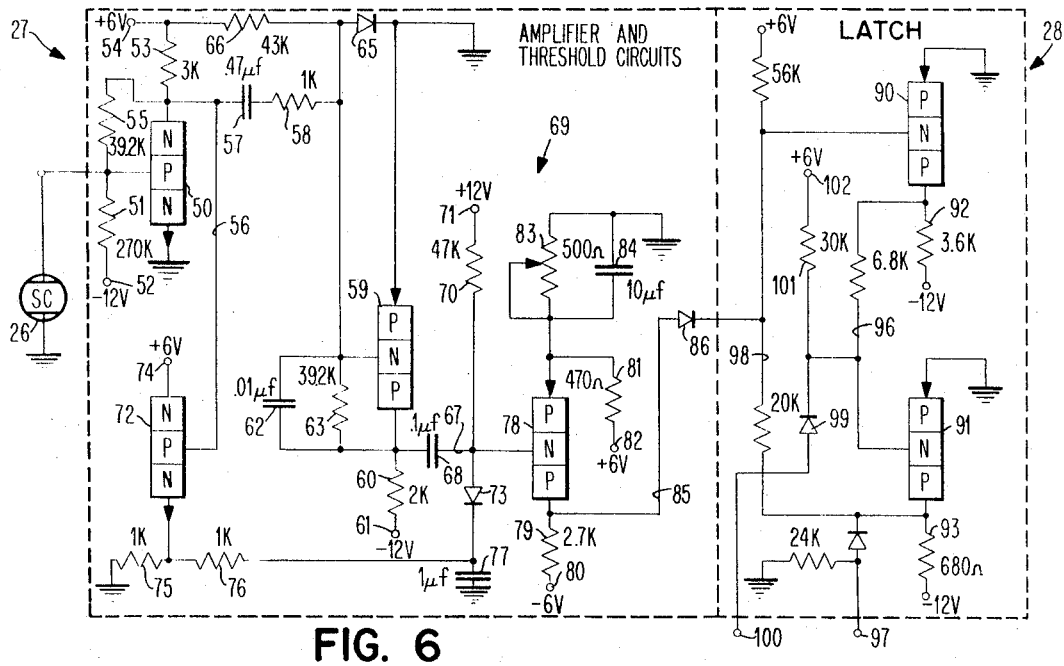
FIGURE 6 is a schematic circuit diagram of the amplifier and latch associated with the timing channel.

Referring now to FIGURE 6 of the drawings, there is shown a schematic circuit diagram of the amplifier and automatic threshold control circuits 27 and latch 28 associated with the timing channel 21. The solar cell 26 has one side grounded and the other side connected to the base of an NPN transistor 50. The base of this transistor is referenced via resistor 51 to the negative voltage level appearing at terminal 52 while the emitter is grounded. The collector is connected in series with resistor 53 to a terminal 54 which is maintained at a positive voltage level. A shunt feedback path including resistor 55 is connected in parallel between the base and collector of transistor 50 for purposes of improving stability of operation. The transistor 50 is biased for Class A operation and acts both as an amplifier and an inverter whereby a positive change in the signal from solar cell 26 (indicating the presence of one of the preprinted timing marks 18) causes a corresponding negative change on conductor 56 leading from the collector of this transistor.

The signal on conductor 56 is applied to a differentiating capacitor 57 which in turn supplies a signal via resistor 58 to the base of PNP transistor 59. As will be later explained, the capacitor 57 performs an important function in accomplishing the object of this invention of being able to differentiate between valid preprinted timing marks and invalid marks, such as tears in the document. The transistor 59 also performs an inverting function, and its emitter is referenced to ground while a resistor 60 is disposed in series between the collector and a terminal 61 which is at a negative voltage level. A parallel circuit comprising capacitor 62 and resistor 63 is connected between the base and collector of the transistor 59 to define a network which presents a relatively high impedance to low frequency components and a relatively low impedance to high frequency components of the signal supplied from the collector of transistor 50. A diode 65 is disposed in the manner shown between the base and emitter of transistor 59 to improve the recovery time of the amplifier and quickly damp out large current changes. A resistor 66 is connected between the terminal 54 and the anode of diode 65. The resistors 66 and 53 connected to terminal 54 define a network for providing a positive bias voltage to the base of transistor 59.

The differentiated and inverted signal from the collector of transistor 59 is applied to a capacitor 68 which performs a direct current isolation function. The signal on conductor 67 is clamped by a clamping network generally designated by reference numeral 69 to a predetermined positive voltage level which varies in accordance with variations in the steady state signal from the solar cell 26. This network comprises a resistor 70 connected between conductor 67 and a terminal 71 maintained at a positive voltage level, a level setting means comprising an NPN transistor 72 connected as an emitter follower and a diode 73 disposed as shown between the conductor 67 and the level setting means. The base of transistor 72 receives a signal over conductor 56 directly from the collector of transistor 50 while the collector of transistor 72 is referenced to a positive voltage level present at terminal 74. The emitter of transistor 72 is connected to ground through resistor 75 and also to the cathode of diode 73 by resistor 76. A capacitor 77 has one side thereof referenced to ground and the other side is connected to the cathode of diode 73 and resistor 76.

The arrangement of the clamping network 69 is such that the signal at the anode of the diode 73 will be clamped to a predetermined positive voltage level which varies in accordance with changes in operation of the solar cell 26. The changes in the clamping level are controlled by the transistor 72 which varies the voltage at the cathode of diode 73 in accordance with the steady state output of the solar cell. The resistor 76 and capacitor 77 define a decoupling filter for effectively eliminating any changes in the clamping voltage level due to the sensing of a preprinted mark or other transient disturbances.

For each of the preprinted marks 18 on a document sensed by the solar cell 26, a negative-going pulse will appear on conductor 67 and is applied to the base of a PNP transistor 78 serving as an inverter and having a predetermined threshold. The collector of transistor 78 is connected in series with resistor 79 to a terminal 80 which is maintained at a negative voltage level. The emitter is connected to the positive voltage level at terminal 82 by resistor 81, and the threshold of the transistor 78 is controlled by the setting of the center tap of potentiometer 83 having a capacitor 84 connected in parallel therewith. When the negative-going pulse on conductor 67 falls below the threshold level of the transistor 78, this transistor will conduct, and a positive-going pulse will be applied over conductor 85 and through diode 86 to the latch 28.

The latch 28 comprises a pair of transistors 90 and 91 whose emitters are grounded and whose collectors are connected to terminals maintained at negative voltage levels by resistors 92 and 93, respectively. A positive-going pulse applied to the base of transistor 90 will render the same nonconductive so that the signal on conductor 96 leading to the base of the transistor 91 falls from a positive voltage to a negative voltage level and the transistor 91 conducts. Conduction of transistor 91 causes the signal at output terminal 97 connected to the collector of transistor 91 to rise from a negative voltage level to approximately ground potential. The signal at the collector of transistor 91 is returned to the base of transistor 90 via conductor 98 so that transistor 90 is maintained in its nonconducting state even after the input pulse on conductor 85 disappears. The circuit is now in its set state and will remain in this state until the same is reset.

Connected to the conductor 96 interconnecting the collector of transistor 90 and the base of transistor 91 is the cathode of a diode 99 whose anode is connected to conditioning and input terminal 100. Also connected to the cathode of the diode 99 is a resistor 101 leading to a terminal 102 which is maintained at a positive voltage level. The arrangement is such that, for the circuit values and voltage levels shown, a potential of plus six volts at terminal 100 when the latch is set (transistor 91 conducting) causes the potential at the base of transistor 91 to rise in the positive direction whereby this transistor is rendered non-conductive. The resulting negative voltage on feedback conductor 98 causes transistor 90 to conduct, and the latch 28 is returned to its original or reset state.

For initial setting of the latch 28 as described above in response to the sensing of a preprinted timing mark 18 on the document, the conditioning and input terminal 100 must be at a negative voltage level of six volts. If the terminal 100 is not at this level when an input signal occurs, the latch will remain in its initial state. The timing circuits 29 supply a voltage level of minus six volts to the terminal 100 of latch 28 slightly before it is expected that a preprinted timing mark 18 will be encountered. A predetermined time interval after the timing mark has been sensed and the latch 28 has been set, the signal supplied to terminal 100 from the timing circuits 29 goes to a level of plus six volts to reset the latch prior to the occurrence of the next timing mark.

Considering now the operation of the timing channel of the mark sensing system, it will be assumed that a document 11 is moving past the sensing station in the direction of the arrow 12. The signal 105 (see FIGURE 8 of the drawings) from the timing circuits 29 goes to the minus six volt level whereby the latch is conditioned for storing an indication that a preprinted timing mark has been sensed. The document continues to move through the sensing station, and a preprinted timing mark 18 is observed by the solar cell 26 to produce a positive-going pulse in the signal 106 supplied to the base of transistor 50. The transistor 50 performs an inverting and amplifying function, and the signal on the conductor 56 is shown by the waveform 107. The preprinted timing mark is relatively wide whereby the negative-going pulse on conductcor 56 has a plurality of low frequency components. The action of the capacitor 57 in differentiating this signal results in a negative-going pulse 108 followed immediately by a positive-going pulse 109 so that a relatively extended positive-going portion 110 is provided.

The differentiated pulse is then inverted by transistor 59 and clamped to a positive voltage determined by the level setting means. The signal applied to the base of transistor 78 is shown by waveform 111 in FIGURE 8 of the drawings, and it should be noted that the level or extent of the negative-going pulse corresponding to sensing of the preprinted timing mark will depend upon the extent or slope of the positive-going portion 110 of the differentiated pulse. A pulse which has a large number of low frequency components will be differentiated by capacitor 57 to a greater extent than a signal containing only high frequency components. The clamping network 69 clamps the positive output from transistor 59 to a predetermined level, and the negative swing of the signal (corresponding to the inverted portion 110) back-biases the diode 73 so that a negative-going pulse is supplied to the base of transistor 78.

The negative-going pulse from clamping network 69 exceeds the preselected threshold of transistor 78. This threshold is determined by the setting of the center tap of potentiometer 83 in accordance with the particular application. Obviously, other means may be used for adjusting the threshold of transistor 78 as will be apparent to those skilled in the arts. Transistor 78 conducts and supplies a positive-going pulse on conductor 85 which sets the latch 28. The setting of latch 28 corresponds to the sensing of a preprinted timing mark on the document and a positive-going signal 112 is supplied to the timing circuits 29 and level translator 30. After a predetermined time interval, the signal 105 at terminal 100 rises to the positive voltage level, and the latch 28 is reset. The timing channel is now conditioned to provide an output signal indicating the sensing of the next preprinted timing mark on the document.

Figure 2:
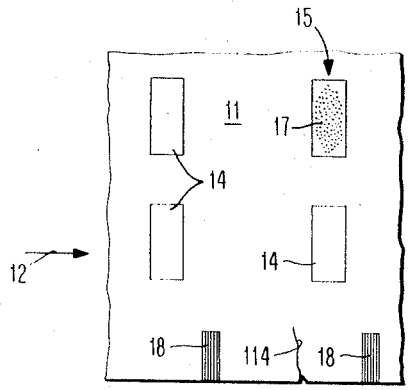
FIGURE 2 is an enlarged and fragmentary plan view of a document showing the preprinted timing marks and a document tear.
Figure 8:
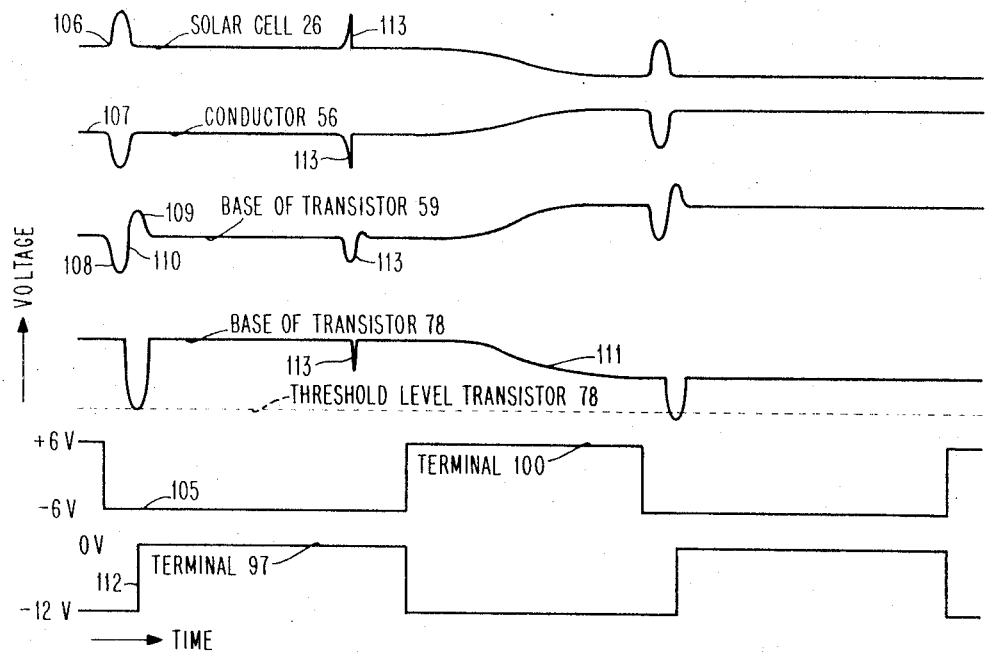
FIGURE 8 is a series of waveforms showing the voltages present at selected points in the circuit of FIGURE 6.

Also shown in the waveforms of FIGURE 8 of the drawings at 113 are the changes occurring in the signals when an invalid mark, such as a hairline tear 114 (see FIGURE 2) in the edge of the document between adjacent ones of the preprinted timing marks 18, is sensed by the solar cell 26. The tear 114 is relatively thin whereby the pulse applied to the base of transistor 50 and the inverted pulse at the collector of this transistor are quite sharp and contain a relatively large number of high frequency components. The inverted pulse corresponding to the tear 114 is differentiated by capacitor 57 to a lesser extent than an inverted pulse resulting from the sensing of a valid timing mark. The action of the clamping network 69 is such that the negative-going signal corresponding to the tear will not exceed the threshold of transistor 78 and the latch 28 cannot be set. The clamping network 69 is responsive to the absolute magnitude of pulses, and a differentiated pulse representing a wide and valid timing mark will have a much greater absolute magnitude (portion 110) than a differentiated pulse occurring due to the sensing of a relatively thin and invalid mark.

The timing channel compensates for variations in the steady state signal levels supplied from solar cell 26 as indicated by the right-hand portions of the waveforms shown in FIGURE 8 of the drawings. As the steady state signal from the solar cell 26 changes, a corresponding signal is coupled to the base of transistor 72 which controls the bias at the cathode of diode 73. The change in the voltage at the cathode of diode 73 is proportional to the change in the operating level of the solar cell 26 so that even though the magnitude of a pulse representing the sensing of a valid timing mark has changed, the threshold level of transistor 78 will be exceeded to set the latch 28. The compensation for changes in the operation of the solar cell is completely automatic and greatly improves the reliability and efficiency of the mark sensing system. The amplitude of a pulse produced by an invalid mark will also change proportionally with changes in the steady state operating level of the solar cell, and the circuit retains the ability to reject invalid marks under these conditions.

Figure 7:
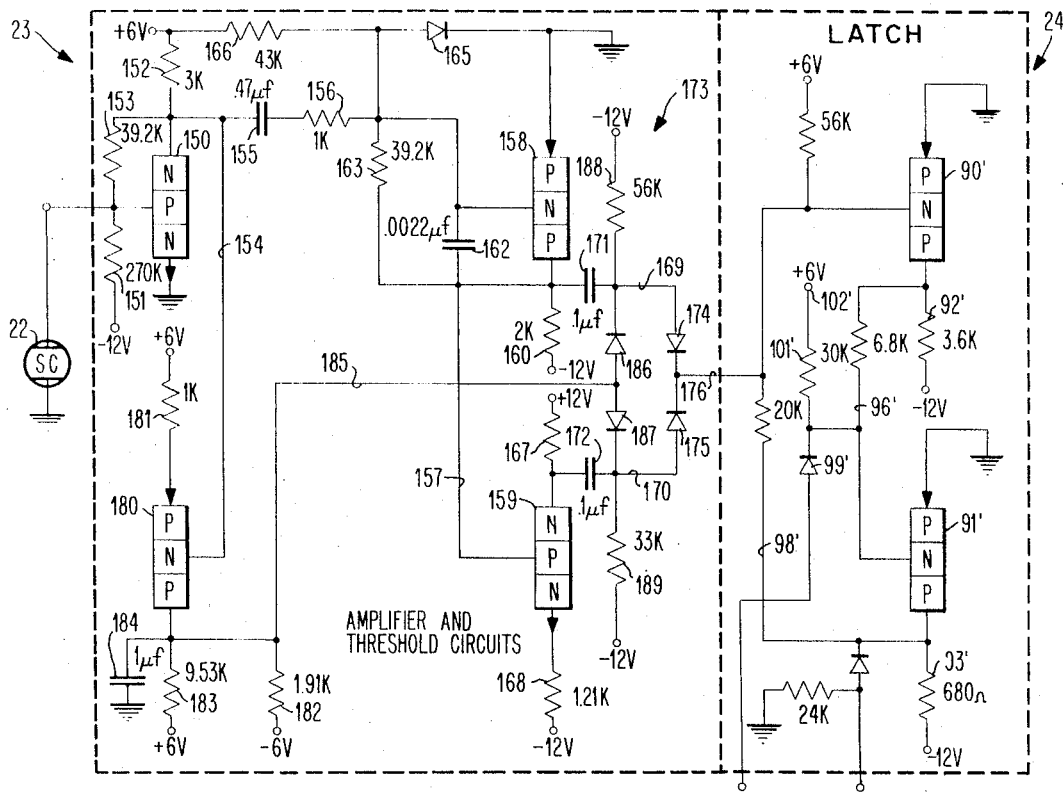
FIGURE 7 is a schematic circuit diagram of the amplifier and latch forming a portion of each of the reading channels.

A schematic circuit diagram of the amplifier and threshold circuits 23 and the latch 24 associated with each of the reading channels 20 is shown in FIGURE 7 of the drawings. The latch 24 is the same as the latch 28, and to avoid unnecessary repetition in the specification, latch 24 will not be described in detail. Primed reference numerals corresponding to the numerals used in connection with latch 28 are employed to designate similar circuit components in the latch 24. The signal at output terminal 97 of latch 28 varies from approximately minus twelve volts to ground potential, and the level translator 30 converts these levels to plus six volts and minus six volts, respectively. The output of the level translator 30 is applied via driver logic block 31 to the conditioning and reset terminals 100' of the latches 24 so that when the latch 28 is set in response to the sensing of a valid timing mark, the latches 24 are conditioned to be set in accordance with the marks 17 in the predesignated marking areas. Resetting of the latch 28 also causes resetting of the latches 24 since the output of the level translator 30 goes to the plus six volts potential level.

The solar cell 22 has one side grounded and the other side provides an input signal to the base of an NPN transistor 150 which performs inverting and amplifying functions. The emitter of transistor 150 is grounded while the base is connected by resistor 151 to a terminal which is maintained at a negative voltage level. The collector of this transistor and a resistor 152 are disposed in series with a terminal connected to a positive source of voltage. A shunt path between the collector and base of transistor 150 is provided by resistor 153. A conductor 154 is connected to the collector of transistor 150, and the signal on this conductor is applied to the series connected differentiating capacitor 155 and resistor 156. The differentiated signal from capacitor 155 is supplied to the base of PNP transistor 158.

The transistor 158 serves as an inverter and has its emitter referenced to ground. The collector of this transistor is connected in series with resistor 160 to a terminal that is maintained at a negative voltage level. A parallel circuit comprising capacitor 162 and resistor 163 are disposed between the base and collector of transistor 158 to define a low impedance path for high frequency components of the differentiated signal. A diode 165 provides a shunt path between the emitter and base of transistor 158 and has its anode connected in series with resistor 166 to a terminal which is at a positive voltage level. The resistors 163 and 166 define a network for providing a bias voltage to the base of transistor 158. In general, the amplifying and inverting stages represented by transistors 150 and 158 in the circuits 23 for each of the reading channels 20 are the same as the amplifying and inverting stages comprising transistors 50 and 59 in the circuits 27 for the timing channel 21.

A transistor 159 receives at its base the differentiated and inverted signal from the collector of transistor 158 over conductor 157, and transistor 159 is connected to serve as an amplifier and inverter. The collector and emitter of transistor 159 are referenced through resistors 167 and 168 to positive and negative voltage levels. The differentiated signals at the collectors of transistors 158 and 159 are inverted with respect to each other in that for a mark in a marking area, a positive-going pulse followed by a negative-going pulse appears at the collector of transistor 158 and negative-going pulse followed by a positive-going pulse occurs at the collector of transistor 159. The signals from the collectors of transistors 158 and 159 are applied to direct current isolation capacitors 171 and 172. The signals from the capacitors 171 and 172 appear on conductors 169 and 170 and are clamped to preselected and adjustable voltage levels by a clamping network 173. The clamped signals are then transmitted via a pair of parallel connected diodes 174 and 175 to an input conductor 176 of the latch 24. The diodes 174 and 175 perform a logical OR function in that a positive pulse of sufficient magnitude on either conductor 169 or 170 will set latch 24 providing this latch is properly conditioned.

The clamping network 173 comprises a PNP transistor 180 which receives at its base the signals from the collector of transistor 150 over conductor 154. The transistor 180 serves as an inverter, and its emitter is connected in series with resistor 181 to a terminal which is at a positive voltage level. The collector of this transistor is connected to a negative source of voltage by resistor 182, to a positive source of voltage by resistor 183 and to ground by a capacitor 184. An output is taken from the collector of transistor 180 and applied over conductor 185 to the mid-point between a pair of diodes 186 and 187 disposed in back-to-back relation. The cathodes of the diodes 186 and 187 are connected to the conductors 169 and 170, respectively. The conductor 169 is referenced to a negative source of voltage through resistor 188 and conductor 170 is also referenced to this negative source through resistor 189.

Figure 3:
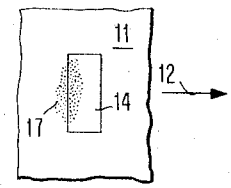
FIGURES 3-5 are a series of fragmentary plan views showing the locations of marks made in predesignated marking areas.

Considering now the operation of the illustrated reading channel, it will be assumed that a preprinted timing mark 18 has been sensed by the solar cell 26, and the latch 28 is set, whereby the latch 24 may be set when a mark in the predesignated marking area is detected. It will also be assumed that a mark 17 is positioned as shown in FIGURE 3 of the drawings with the trailing edge of the mark falling outside the predesignated marking area. The width of the marking area 14 corresponds to the time interval during which the latch 24 may be set to indicate that a recorded mark is present.

Figure 9:
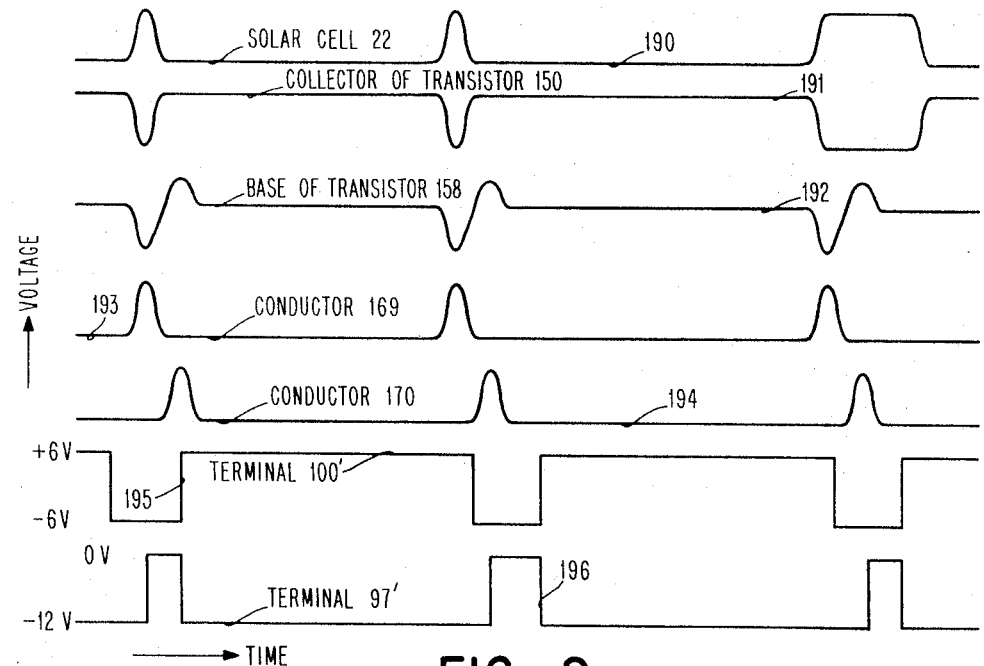
FIGURE 9 is a series of waveforms depicting the voltages at certain points in the circuit of FIGURE 7.

The mark 17 shown in FIGURE 3 of the drawings is eventually sensed by the solar cell 22, and a positive pulse as depicted by waveform 190 in FIGURE 9 of the drawings is applied to the base of transistor 150. This transistor performs inverting and amplifying functions, and a negative-going pulse appears in waveform 191 at the collector. The inverted pulse is differentiated by the capacitor 155, and a negative-going pulse immediately followed by a positive-going pulse occurs in the signal 192 applied to the base of transistor 158. The signals 193 and 194 on the conductors 169 and 170 are clamped to predetermined voltage levels whereby a positive-going pulse appears on conductor 169 which is followed by a positive-going pulse on conductor 170. The diodes 186 and 187 are back-biased when the pulses appear on conductors 169 and 170.

The positive-going pulse on conductor 169 occurs first and within the time interval that signal 195 at conditioning and reset terminal 100′ of latch 24 is at the negative voltage level, and this latch is set as represented by waveform 196. The pulse on conductor 169 corresponds to the leading edge of the mark 17 shown in FIGURE 3 of the drawings and is employed to set the latch. After a short time interval the latch 28 in the timing channel is reset, and this causes latch 24 to be reset to its original state. Shortly before the timing latch 28 is reset, the latches 24 associated with the reading channels 20 are sampled to determine those of the marking areas 14 in a column 15 which have been marked and to provide corresponding output signals to other apparatus.

Figure 4:
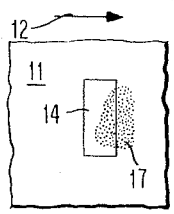

An individual may place a mark 17 in one of the predesignated marking areas in the manner shown in FIGURE 4 of the drawings where the leading edge is without and the trailing edge is within the marking area. When this condition is encountered, as represented by the pulses in the center portions of the waveforms shown in FIGURE 9 of the drawings, the pulse on conductor 169 occurs before the latch 24 is conditioned by the signal at terminal 100′ going to the plus six volts potential level. However, the pulse on conductor 170 appears when the latch 24 is properly conditioned so that the latch is set to provide an output indication of the mark. The pulse on conductor 170 corresponds generally to the trailing edge of the mark 17 which is within the predesignated marking area.

Figure 5:
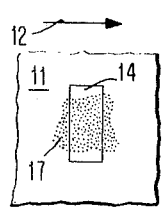

A third marking possibility is shown in FIGURE 5 of the drawings wherein both the leading and trailing edges of the mark 17 fall outside of the predesignated marking area. The corresponding pulses resulting from such a mark are shown in the right-hand portions of the waveforms of FIGURE 9 of the drawings. It will be noted that the positive-going pulse in the output of solar cell 22 begins before and ends after the time interval when the latch 24 is conditioned. However, a pulse will appear on conductor 170 during this time interval to set the latch 24 since the time constant of the series resistance-capacitance circuit comprising differentiating capacitor 155 and resistor 156 is such that the capacitor will discharge before the end of the pulse corresponding to the oversize mark. The capacitor 155 has a relatively low value for this purpose.

As mentioned above, the circuits 27 comprise automatic threshold adjusting means. An increased steady state output signal from the solar cell 22 will produce a pulse of greater amplitude when a mark is sensed, and a smaller steady state signal from the solar cell will provide a smaller pulse when an identical mark is detected. If the steady state signal level from the solar cell 22 changes, the bias voltage applied over conductor 185 to the anodes of diodes 186 and 187 also changes to vary the levels to which the signals on conductors 169 and 170 are clamped. An increase in the current from the solar cell 22 will cause transistor 180 to decrease the voltage level on conductor 185 so that the levels to which conductors 169 and 170 are clamped are lowered. A decrease in the current from the solar cell 22 is applied over conductor 154 to the base of transistor 180, and the clamping levels on conductors 169 and 170 are raised. The changes effected in the clamping levels on conductors 169 and 170 in response to changes in the steady state operation of the solar cell are preferably determined by obtaining a graph of output voltage over the expected operating range of cell currents and selecting emitter and collector resistance values for transistor 180 in accordance with the characteristics of the solar cell. The clamping levels on conductors 169 and 170 can be made to vary in direct proportion or non-linearly with respect to changes in the operation of the solar cell as is desired for a given application.

The use of automatic threshold adjusting means in the reading channels and the timing channel is particularly advantageous since the mark sensing apparatus can operate for extended periods of time with a minimum of maintenance and without producing erroneous output signals indicating the presence of a mark where none has been recorded or the absence of a mark where one has been recorded. The reading channels are capable of differentiating between invalid marks, such as smudges, smears, etc., regardless of changes in the operating levels of the individual solar cells. The components of the optical system and the solar cells associated with the reading channels need not be as accurately aligned with respect to the apparatus of the timing channel since a signal corresponding to the leading or trailing edge of a mark will set one of the latches to provide an output indication of the sensing of a mark in one of the predesignated marking areas. This also allows the sensing of marks whose leading and/or trailing edges fall outside of the predesignated marking areas.

While the invention has been particularly shown and described with reference to a preferred embodiment thereof, it will be understood by those skilled in the art that the above and other changes in form and details may be made therein without departing from the spirit and scope of the invention.

What is claimed is:

1. A mark sensing system for sensing preprinted timing marks and marks recorded in predesignated marking areas on a document and providing output indications corresponding to the presence and absence of said recorded marks in said predesignated marking areas comprising:

a timing channel and at least one reading channel;

said timing channel comprising a transducer means for sensing a preprinted timing mark and providing an electrical signal in response thereto;

means to differentiate said electrical signal to produce a first pulse of one polarity followed by a second pulse of the opposite polarity;

a first device settable by electrical signals to at least two stable states and providing output signals corresponding thereto;

means responsive to the total absolute magnitude of said first and second pulses for actuating said first device;

said reading channel comprising a transducer means for sensing a mark recorded in a predesignated marking area and providing an electrical signal in response thereto;

means to differentiate said electrical signal from said transducer means of said reading channel and providing a third pulse of one polarity followed by a fourth pulse of the opposite polarity;

a second device settable in response to electrical signals to at least two stable states and providing output signals corresponding thereto;

conditioning means associated with and conditioning said second device for actuating in response to actuation of said first device; and means responsive to said third pulse or said fourth pulse for actuating said second device when said second device is conditioned.

2. Apparatus according to claim 1 further characterized by:
said means responsive to said total absolute magnitude comprising means for clamping said first and second pulses at a level corresponding to the approximate peak level of one of said first and second pulses; and
means to vary the clamping level of said means for clamping in accordance with changes in the steady state operation of said transducer means associated with said timing channel.

3. Apparatus according to claim 1 further characterized by:
said means responsive to said third pulse or said fourth pulse comprising a pair of parallel connected circuits each receiving said third and fourth pulses;
clamping means associated with said parallel connected circuits for allowing the passage through one of said circuits of a signal corresponding to said third pulse and the passage through the other of said circuits of a signal corresponding to said fourth pulse; and
means to adjust said clamping means associated with said parallel connected circuits in accordance with changes in the steady state operation of said transducer means associated with said reading channel.

4. A mark sensing system for sensing marks recorded on a document and providing output indications corresponding to the presence and absence of marks comprising:
a pair of channels each having a transducer means for sensing a mark and providing an electrical signal in response thereto;
means to differentiate the electrical signal provided by the transducing means of one of said channels to produce a first pulse of one polarity followed by a second pulse of the opposite polarity;
means responsive to the total absolute magnitude of said first and second pulses to provide an output signal representing the sensing of a mark by said transducing means of said one of said channels;
means to differentiate the electrical signal provided by the transducing means of the other of said channels to produce a third pulse of one polarity followed by a fourth pulse of the opposite polarity; and
means responsive to the occurrence of said third pulse or said fourth pulse in a predesignated timing interval to provide an output signal representing the sensing of a mark by said transducing means of said other of said channels.

5. Apparatus according to claim 4 further characterized by:
said means responsive to said total absolute magnitude of said first and second pulses comprising means for clamping said first and second pulses at a level corresponding to the approximate peak level of one of said first and second pulses.

6. Apparatus according to claim 4 further characterized by:
said means responsive to the occurrence of said third pulse or said fourth pulse comprising a pair of parallel connected circuits, each receiving signals corresponding to said third and fourth pulses; and
clamping means associated with said parallel connected circuits for allowing the passage through one of said circuits of a signal corresponding to said third pulse and the passage through the other of said circuits of a signal corresponding to said fourth pulse.

7. Apparatus according to claim 6 further characterized by:
means to adjust said clamping means in accordance with changes in the steady state operation of said transducing means of said other of said channels.

8. A mark sensing system for sensing marks recorded on a document and providing output indications corresponding to the presence and absence of marks comprising:
transducer means for sensing the presence of a mark and providing an electrical signal in response thereto;
means responsive to said electrical signal for providing a first pulse of one polarity followed by a second pulse of the opposite polarity;
means to detect said first and second pulses and provide a signal having an amplitude corresponding to the absolute magnitude of said first and second pulses;
a circuit device having a preselected threshold; and
said last-mentioned signal actuating said circuit device to provide an output indication corresponding to the sensing of a recorded mark when the amplitude thereof exceeds said preselected threshold.

9. A mark sensing system for sensing marks recorded on a document to provide output indications corresponding to the presence of valid marks recorded on a document and capable of distinguishing between valid and invalid marks comprising:
transducer means for sensing the presence of a mark and providing an electrical signal in response thereto;
means to differentiate said electrical signal to provide a first pulse of one polarity followed by a second pulse of the opposite polarity;
said second pulse having an amplitude relative to the amplitude of said first pulse which is large for a valid mark and small for an invalid mark;
means to detect said first and second pulses and provide a signal having an amplitude corresponding to the absolute magnitude of said first and second pulses;
a circuit device having a preselected threshold; and
said last-mentioned signal actuating said circuit device to provide an output indication corresponding to the sensing of a valid mark when the amplitude thereof exceeds said preselected threshold.

10. Apparatus according to claim 9 further characterized by:
said means to detect comprising a clamping means for clamping said first and second pulses to a clamping level; and
means to adjust said clamping level in response to changes in the steady state operation of said transducer means.

11. A mark sensing system for sensing marks recorded on a document and providing output indications corresponding to the presence and absence of marks comprising:
transducer means for sensing the presence of a mark and providing an electrical signal in response thereto;
means responsive to said electrical signal for providing a first pulse of one polarity followed by a second pulse of the opposite polarity;
a pair of parallel connected circuits responsive to said first and second pulses and for allowing the passage through one of said circuits of a signal corresponding to said first pulse and the passage through the other of said circuits of a signal corresponding to said second pulse;
a settable circuit device receiving said corresponding signals; and
means to condition said device during a preselected time interval to permit actuation of said device by either of said corresponding signals which occur during said time interval.

12. A mark sensing system for sensing marks recorded in predesignated marking areas on a document and providing output indications corresponding to the presence and absence of marks in said areas comprising:
transducer means for sensing the presence of a mark and providing an electrical signal in response thereto whose leading edge corresponds to the leading edge of a mark and whost trailing edge corresponds to the trailing edge of the mark;

means to differentiate said electrical signal to provide a first pulse of one polarity followed by a second pulse of the opposite polarity;

a pair of parallel circuits responsive to said pulses and allowing the passage through one of said circuits of a signal corresponding to said first pulse and the passage through the other of said circuits of a signal corresponding to said second pulse;

a conditionable circuit device receiving said corresponding signals;

means to condition said circuit device for the reception of said corresponding signals during a time interval corresponding to a predesignated marking area on said document; and said device providing an output indication of a mark even though the leading or trailing edge of the mark falls outside of the predesignated marking area.

13. Apparatus according to claim 12 further characterized by:

said pair of parallel circuits comprise a clamping network for clamping said first and second pulses to different clamping levels; and means to adjust said clamping levels in response to changes in the steady state operation of said transducer means.

14. Apparatus according to claim 12 further characterized by:

said means to differentiate comprises an energy storage circuit having a time constant; and said time constant having a value which permits said second pulse to occur within said time interval when the leading and trailing edges of a mark are outside of a predesignated marking area.

References Cited by the Examiner

UNITED STATES PATENTS

| | | | |
|---|---|---|---|
| 2,929,049 | 3/1960 | Lubkin | 340—174 |
| 3,088,665 | 5/1963 | Branscomb | 235—61.11 |

MAYNARD R. WILBUR, *Primary Examiner.*

R. COUNCIL, *Assistant Examiner.*